United States Patent
Cheng et al.

(10) Patent No.: US 7,071,625 B2
(45) Date of Patent: Jul. 4, 2006

(54) LED ILLUMINATOR WITH CAPABILITY OF STABLE BRIGHTNESS

(76) Inventors: Hsin-Hui Cheng, 3F, No. 4, Lane 489, Jinhsin St., Chungho City, Taipei Hsien (TW); Alan Chiu, 3F, No. 4, Lane 489, Jinhsin St., Chungho City, Taipei Hsien (TW)

( * ) Notice: Subject to any disclaimer, the term of this patent is extended or adjusted under 35 U.S.C. 154(b) by 0 days.

(21) Appl. No.: 10/409,907

(22) Filed: Apr. 8, 2003

(65) Prior Publication Data

US 2004/0201991 A1   Oct. 14, 2004

(51) Int. Cl.
*H05B 37/00* (2006.01)

(52) U.S. Cl. .................... 315/86; 315/291; 315/308

(58) Field of Classification Search ............. 315/86, 315/149–150, 200 R, 206, 209 R, 246, 291, 315/307–308, 362; 307/116–117, 125–126, 307/130–131; 320/128, 135
See application file for complete search history.

(56) References Cited

U.S. PATENT DOCUMENTS

| | | | | |
|---|---|---|---|---|
| 4,727,291 A * | 2/1988 | Bavaro | .................. | 315/86 |
| 4,998,057 A * | 3/1991 | Shinohara et al. | .......... | 320/150 |
| 5,471,114 A * | 11/1995 | Edwards et al. | .............. | 315/86 |
| 5,646,486 A * | 7/1997 | Edwards et al. | .............. | 315/86 |
| 5,754,868 A * | 5/1998 | Yamamoto et al. | ........ | 713/300 |
| 6,445,086 B1 * | 9/2002 | Houston | ................ | 307/24 |
| 6,479,965 B1 * | 11/2002 | Barbeau et al. | ............ | 320/115 |

* cited by examiner

*Primary Examiner*—Thuy Vinh Tran
(74) *Attorney, Agent, or Firm*—Charles E. Baxley

(57) ABSTRACT

An LED illuminator with the capability of stale brightness, which has the function of emergent lighting and night lighting, is disclosed. The disclosed LED illuminator has a charging unit, a switching unit, a detecting unit and a voltage-stabilizing unit. The detecting unit is adopted for detecting the brightness of the light in the light. The charging unit is used for charging the battery module of the LED illuminator, while the switching unit is used for replacing the power supply with the battery when needing emergent lighting. The voltage-stabilizing unit is adopted for adjusting the working voltage to keep the brightness stable during the LED illuminating period.

9 Claims, 4 Drawing Sheets

LED ILLUMINATOR WITH CAPABILITY OF STABLE BRIGHTNESS

BACKGROUND OF THE INVENTION

1. Field of Invention

The invention is related to an LED illuminator, and more particularly to an LED illuminator with ability of stable brightness applied in emergent lighting and night lighting.

2. Related Art

In the old times, people worked in the day and rested in the night. The situation indicated that the light is very important to people livings. People relied on the sunlight such that all activities were restricted when the night came. This situation did not get better until the appearance of the illuminating devices. Under the continuous development of the illuminating devices, there are various kinds of illuminators form portable flashlight to search light. Gradually, the illuminating devices are transferred from light bulbs to LEDs.

The LEDs have been widely employed because of the small volume, long usage life, lower power consumption, and less easy damaged than light bulbs. The improving brightness of the LED is also one of the key factors. The conventional LED illuminators employ light emitting diode (LED) as the illuminating element because of better brightness and lower power consumption. However, when the working voltage is below a predetermined level, usually about 3 volts, the brightness is affected and becomes unstable. The unstable light may damage people's eyes.

It is concluded that remaining the brightness of the LED illuminators effectively is necessary.

SUMMARY OF THE INVENTION

The main object of the invention is to provide an LED illuminator with the capability of stale brightness. The disclosed LED illuminator has a charging unit, a switching unit, a detecting unit and a voltage-stabilizing unit. The detecting unit is adopted for detecting the brightness of the light in the light. The charging unit is used for charging the battery module of the LED illuminator, while the switching unit is used for replacing the power supply with the battery module when needing emergent lighting. The voltage-stabilizing unit is adopted for adjusting the working voltage so as to keep the brightness stable during the LED illuminating period.

Further scope of applicability of the present invention will become apparent from the detailed description given hereinafter. However, it should be understood that the detailed description and specific examples, while indicating preferred embodiments of the invention, are given by way of illustration only, since various changes and modifications within the spirit and scope of the invention will become apparent to those skilled in the art from this detailed description.

BRIEF DESCRIPTION OF THE DRAWINGS

The present invention will become more fully understood from the detailed description given hereinbelow illustration only, and thus are not limitative of the present invention, and wherein.

DETAILED DESCRIPTION OF THE INVENTION

Figure 1:
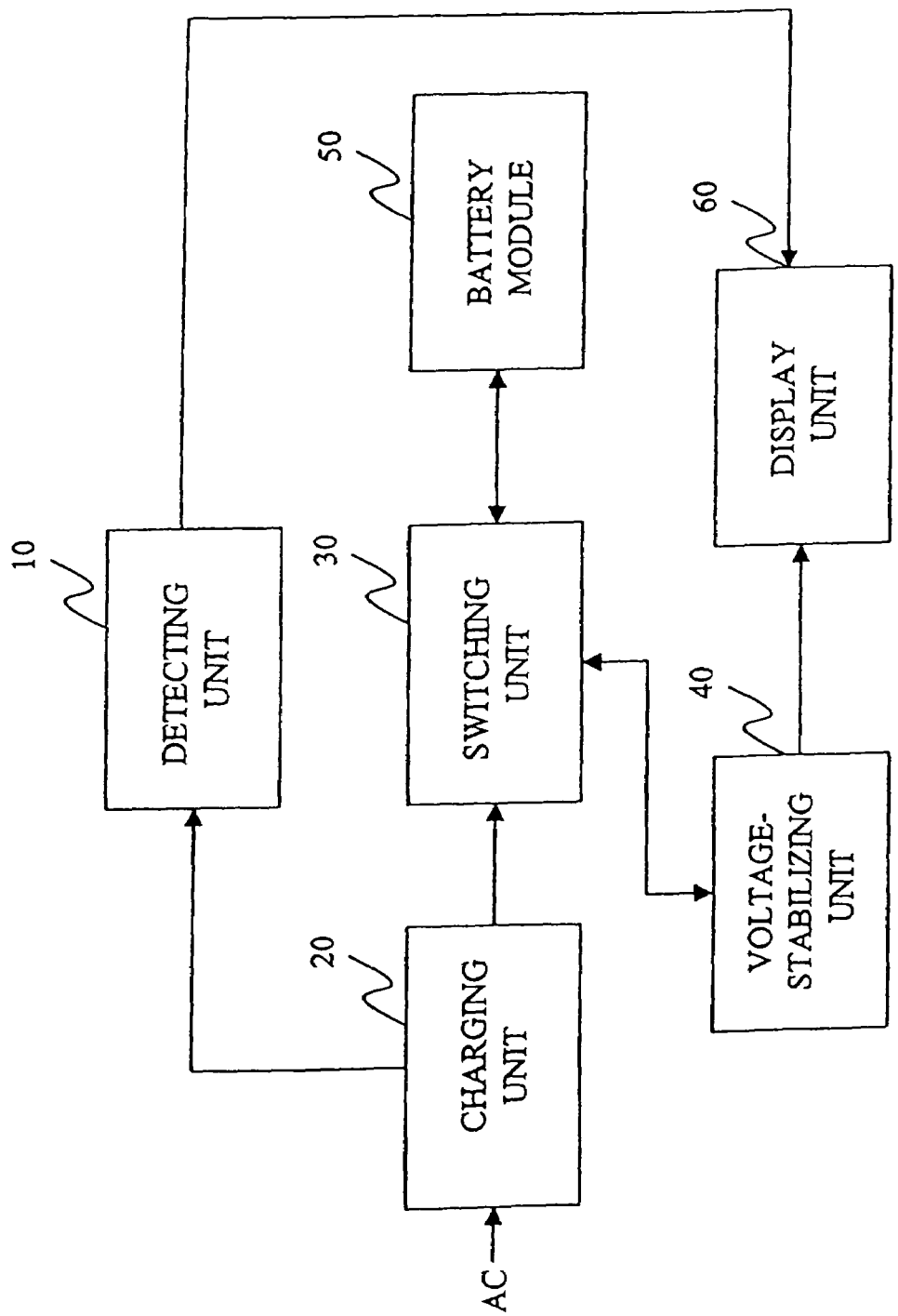
FIG. 1 is the block diagram of the LED illuminator with capability of stable brightness of the invention.

An LED illuminator with the capability of stale brightness, which has the function of emergent lighting and night lighting, is disclosed. Please refer to FIG. 1 illustrating the block diagram of the LED illuminator with capability of stable brightness of the invention.

The LED illuminator of the invention includes a detecting unit 10, a charging unit 20, a switching unit 30, a voltage-stabilizing unit 40, a battery module 50 and a display unit 60. The charging unit 20 is connected to the plug means of the LED illuminator for receiving an external alternating current power source. Then the AC power source is rectified as an external working voltage, which is then delivered to charge the battery module 50. The detecting unit 10 has a light detecting element, e.g., light sensitive resistor, for detecting the brightness of the external light. When the brightness of the external light is insufficient, or in the night, the display unit 60 is triggered to illuminating thus the night lighting function is achieved. When the brightness of the external light is sufficient, the display unit 60 is not triggered.

The battery module 50 has at least one rechargeable battery, such as nickel metal hydride battery, lithium battery etc. The battery module 50 receives the external working module normally. When the external working voltage discontinues, an internal working voltage is output, while the switching unit 30 switches the power source as the batter module 50 and transmits the internal working voltage to the display unit 60 for lighting. Thus an emergent lighting function is achieved. The voltage-stabilizing unit 40, which is connected to the switching unit 30, is employed for stabilizing the internal working voltage. When the internal working voltage fluctuates, the voltage-stabilizing unit 40 boosts or bucks the internal working voltage to a predetermined level and transmits the boosted or bucked voltage to the display unit 60. Thus, the working voltage transmitted to the display unit 60 remains stale during the illuminating period. The display unit 60 includes at least a LED.

Figure 2:
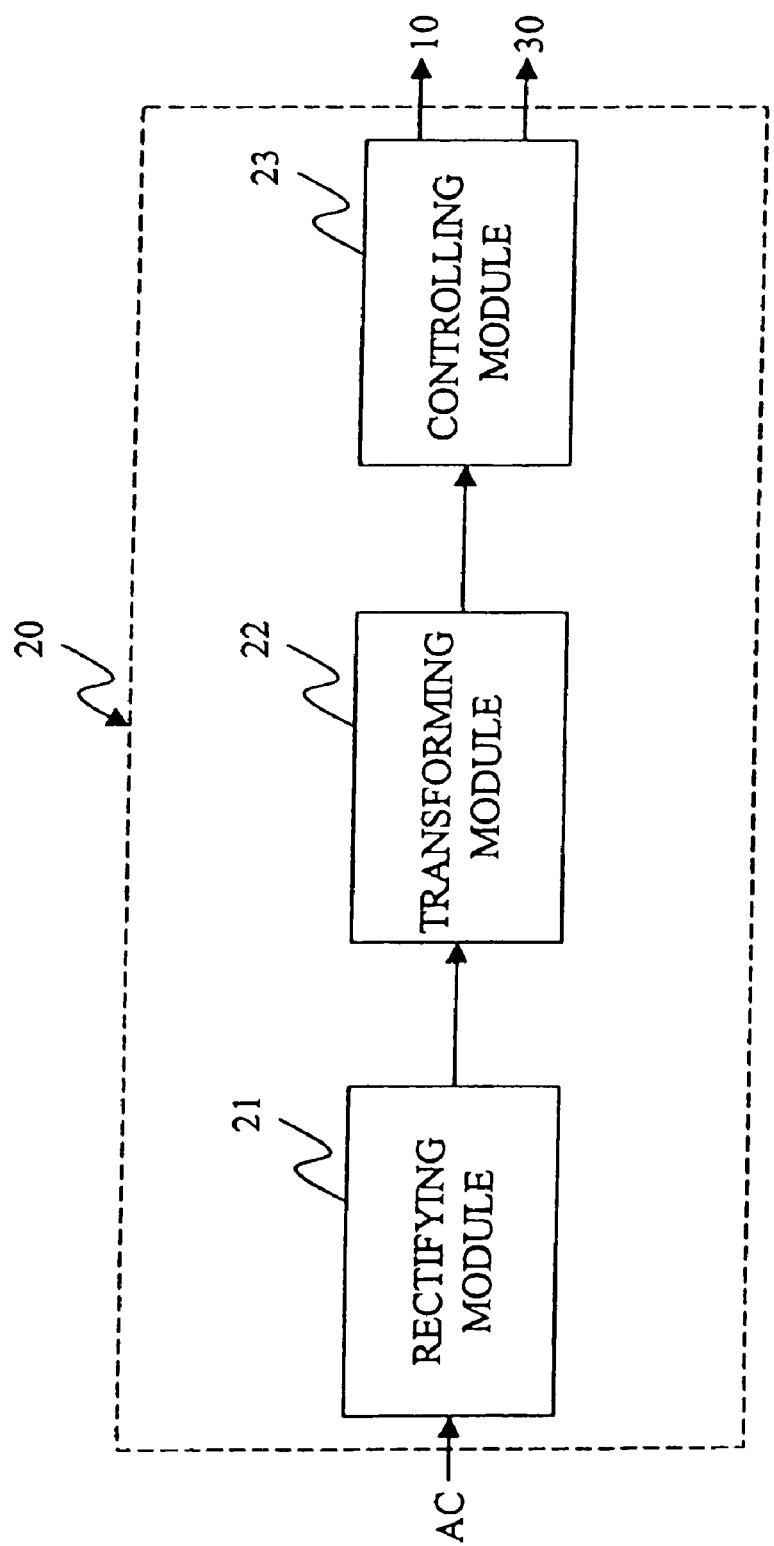
FIG. 2 is the block diagram of the charging unit of the LED illuminator with capability of stable brightness of the invention.

The details of the charging unit 20 are illustrated as follows. Please refer to FIG. 2 showing the block diagram of the charging unit of the LED illuminator with capability of stable brightness of the invention.

The charging unit 20 includes a rectifying module 21, a transforming module 22 and a controlling module 23 such that the disclosed LED illuminator is suitable for different voltage standard of different nations. The rectifying module 21 has a bridge rectifier connected to the external alternating current power source thereby transforming the external alternating current power source into a direct power source. The transforming module 22 is connected to the rectifying module 21 for receiving the direct power source and bucking the direct power source. The transforming module 22 is composed of low power off-line switchers and transformers. Therefore, the LED illuminator is suitable for different voltage standard of different nations. The controlling module 23 further comprises a Zener diode such that the bucked direct current power source is fixed at the predetermined level precisely for charging the battery module 50 conveniently.

Figure 3:
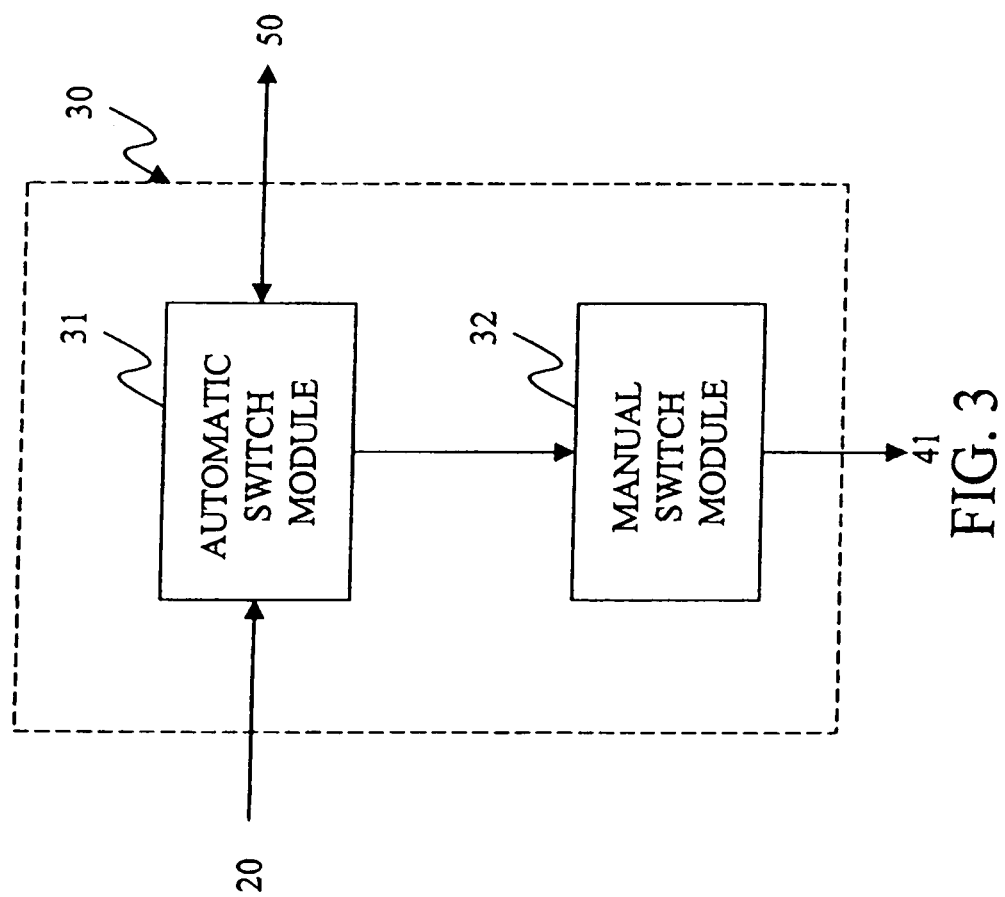
FIG. 3 is the block diagram of the switching unit of the LED illuminator with capability of stable brightness of the invention.

The details of the switching unit 30 are illustrated as follows. Please refer to FIG. 3 showing the block diagram of the switching unit of the LED illuminator with capability of stable brightness of the invention.

The switching unit 30 includes an automatic switch module 31 and a manual switch module 32. The automatic switch module has a relay. One end of the switch unit 31 is connected to the controlling module 23 of the charging unit 20, and the other is connected to the battery module 50. The switching unit 30 is employed for receiving the external working voltage. When the external working voltage discontinues, the power source is switched as the internal working voltage provided by the battery module 50. Meanwhile, the internal working voltage is delivered to the manual switch module 32. The manual switch module 32 has a switch for manually switching the display condition of the display unit 60. Either closing the emergent function or lighting by some LEDs, users can select the display condition manually.

Figure 4:
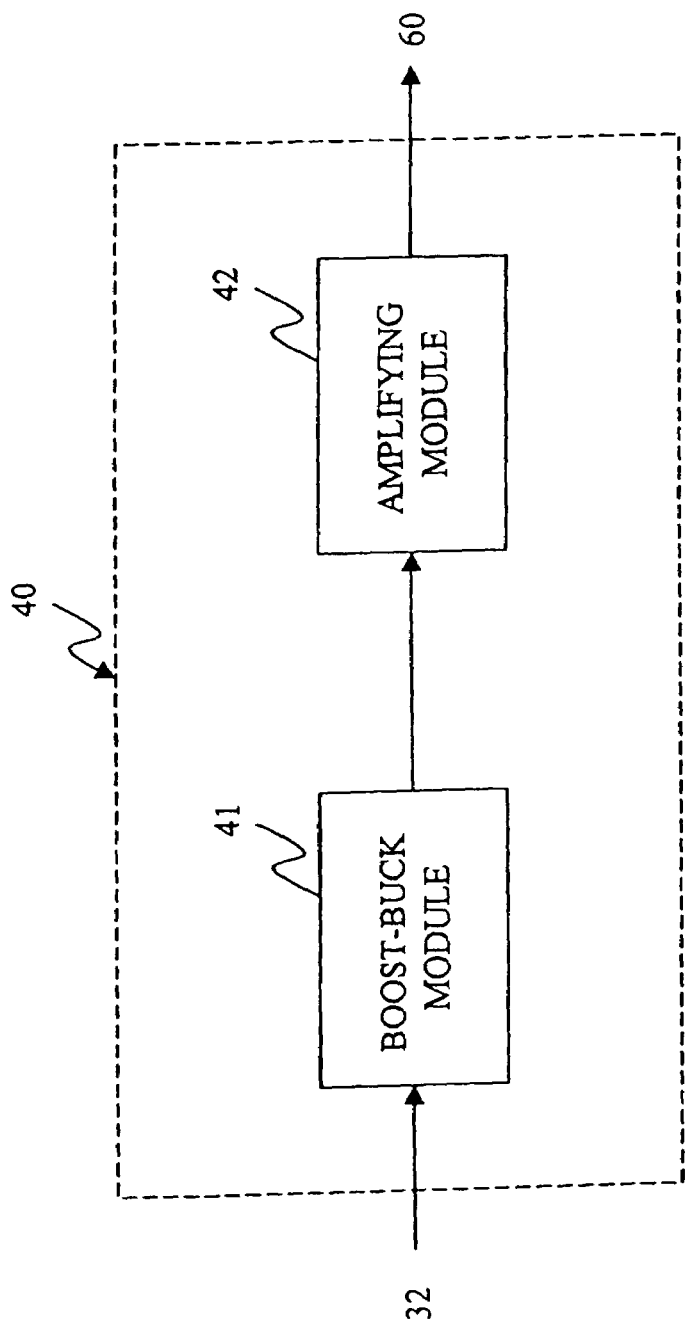
FIG. 4 is the block diagram of the voltage-stabilizing unit of the LED illuminator with capability of stable brightness of the invention.

For stabilizing the brightness of the LED illuminator, a voltage-stabilizing unit 40 is also implemented. The details of the voltage-stabilizing unit 40 are illustrated as follows. Please refer to FIG. 4 showing the block diagram of the voltage-stabilizing unit of the LED illuminator with capability of stable brightness of the invention.

The voltage-stabilizing unit 40 includes a boost-buck module 41 and an amplifying module 42. After receiving the internal working voltage, the boost-buck module 42 adjusts the voltage level of the internal working voltage. When the level of the internal working voltage is below the predetermined level, the level of that is boosted to the predetermined level via a boosting circuit. When the level of the internal working voltage is above the predetermined level, the level of that is bucked to the predetermined level via a bucking circuit. The amplifying module 42 has a transistor for amplifying the current of the internal working voltage when the voltage level of the internal working voltage is below the predetermined level.

The disclosed LED illuminator with capability of stable brightness has both functions of emergent lighting and night lighting. When the electricity of the battery module is sufficient, the brightness of the LED illuminator is controlled by a voltage-stabilizing unit. Furthermore, the working voltage can be boosted when the voltage level of the battery module is below the voltage level of the working voltage. Therefore, the LED illuminator of the invention lasts longer lighting time. Furthermore, the LED illuminator of the invention has a better voltage response than the prior LED illuminator by implementing a low power off-line switchers and transformers in the transforming module.

The invention being thus described, it will be obvious that the same may be varied in many ways. Such variations are not to be regarded as a departure from the spirit and scope of the invention, and all such modifications as would be obvious to one skilled in the art are intended to be included within the scope of the following claims.

What is claimed is:

1. An LED illuminator with capability of stable brightness which has functions of emergent lighting and night lighting, comprising:
    a battery module for outputting an internal working voltage of the LED illuminator;
    a charging unit, which is connected to an external alternating current power source, for transforming the external alternating current power source to an external working voltage to charge the battery module;
    a switching unit, which is connected to the charging unit, for switching the power source with the internal working voltage when the external working voltage discontinues and activating the emergent lighting function;
    a display unit, which is connected to the switching unit for receiving the internal working voltage thereby lighting;
    a detecting unit, which is connected to the display unit, for detecting brightness outside the LED illuminator and activating the display unit for night lighting when the brightness discontinues; and
    a voltage-stabilizing unit, which is connected to the switching unit, for stabilizing the internal working voltage by boosting and bucking the internal working voltage to a predetermined voltage level when the internal working voltage fluctuates and transmitting the stabilized voltage to the display unit.

2. The LED illuminator of claim 1, wherein the charging unit comprises:
    a rectifying module which is connected to the external alternating current power source, for transforming the external alternating current power source into a direct current power source;
    a transforming module, which is connected to the rectifying module, for bucking the voltage of the direct current power source and transmitting the bucked voltage to an output end; and
    a controlling module, which is connected to the transforming module, for fixing a level of the direct current power source at a level of the external working voltage and then transmitting the external working voltage to the switching unit.

3. The LED illuminator of claim 2, wherein the transforming module comprises a low power off-line switchers and a transformer.

4. The LED illuminator of claim 2, wherein the controlling module comprises a Zener diode.

5. The LED illuminator of claim 1, wherein the switching unit comprises:
    an automatic switch module, which is connected to the charging unit and the battery module, for receiving the external working voltage and transmitting the internal working voltage to an output end when the external working voltage discontinues; and
    a manual switch module, which is connected to the automatic switch module, for transmitting a internal working voltage to the voltage-stabilizing unit according to a mode selected by the user.

6. The LED illuminator of claim 5, wherein the automatic switch module comprises a relay.

7. The LED illuminator of claim 1, wherein the voltage-stabilizing unit comprises:
    a boost-buck module, which is connected to a manual switch module, for receiving the internal working voltage, when a voltage level of the internal working voltage is below a predetermined level, boosting the voltage level of the internal working voltage to the predetermined level, and when being above the predetermined level, bucking the voltage level of the internal working voltage to the predetermined level; and
    an amplifying module, which is connected to the boost-buck module, for amplifying the current of the internal working voltage when the internal working voltage level is below the predetermined level, and then transmitting the amplified current to the display unit.

8. The LED illuminator of claim 1, wherein the display unit comprises at least a LED.

9. The LED illuminator of claim 1, wherein the battery module comprises at least a rechargeable battery.

* * * * *